C. H. GRINGS.
HARNESS SADDLE.
APPLICATION FILED JAN. 13, 1908.
911,037.
Patented Feb. 2, 1909.
2 SHEETS—SHEET 1.
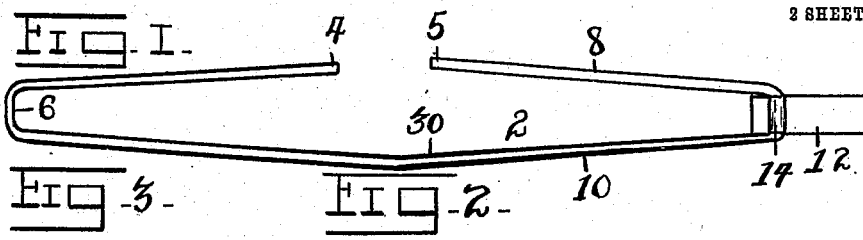
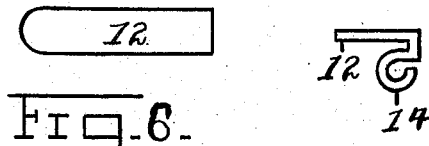
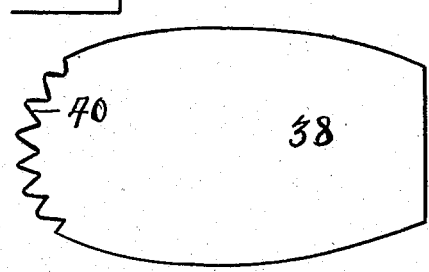
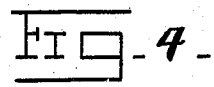
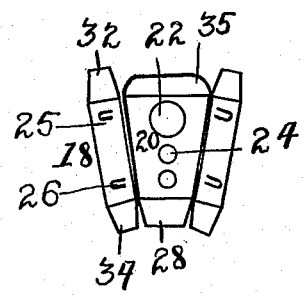
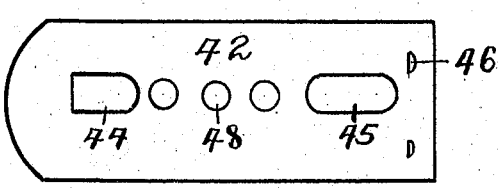
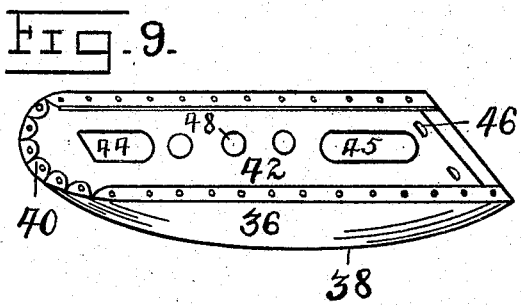
Witnesses
Frances Pedersen
Vida L. Hatter
Inventor
Casper H. Grings
By M. M. Body
Attorney

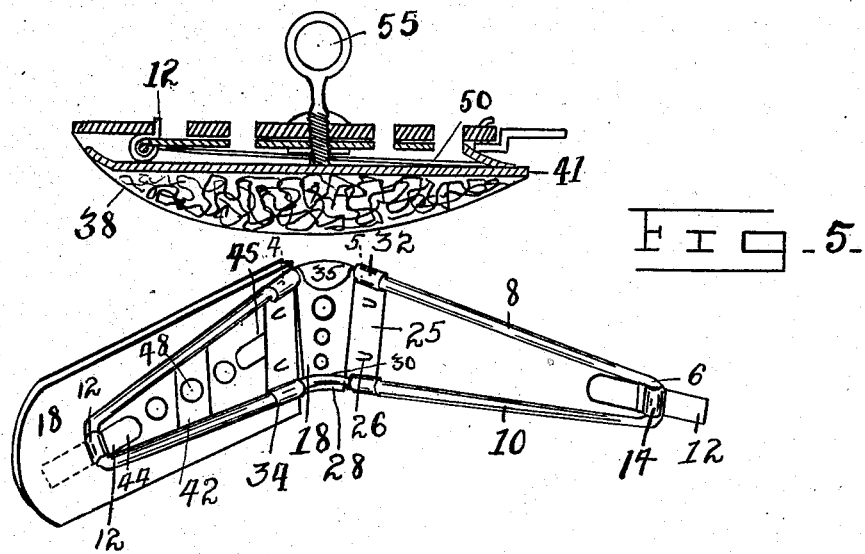

UNITED STATES PATENT OFFICE.

CASPER H. GRINGS, OF DUBUQUE, IOWA.

HARNESS-SADDLE.

No. 911,037.　　　Specification of Letters Patent.　　　Patented Feb. 2, 1909.

Application filed January 13, 1908. Serial No. 410,554.

*To all whom it may concern:*

Be it known that I, CASPER H. GRINGS, citizen of the United States, residing at Dubuque, in the county of Dubuque and State of Iowa, have invented certain new and useful Improvements in Harness-Saddles, of which the following is a specification.

My invention relates to harness saddles, more particularly to gigs, express, coach and team saddles, and the object is to materially cheapen the cost of construction by uniting the stuffed pad to a novel tree without the use of the numerous tacks, rivets, staples and the like and without the aid of an expert or other skilled labor.

It consists essentially of a saddle pad constructed in separate halves and separate from the tree, further in a tree constructed of a single wire bent in the desired shape and provided with one or more hooks or clasps on its outer ends, and in the center with a clasping plate also provided on each end with one or more hooks, all of which hooks, when the tree is inserted in the pads, are adapted to engage the bur-piece and rigidly hold the pads upon the tree.

The following specification will describe the mode of construction and manner of using when taken in connection with the drawings illustrating the same and forming a part hereof.

Figure 1 is a top view of the body of the tree. Fig. 2 is a plan view of the hook or clasp that is attached to the outer ends of the tree shown in Fig. 1. Fig. 3 is a side view of Fig. 2 when bent for attachment to the body. Fig. 4 is a perspective view of the central plate before it is attached to the wire. Fig. 5 is a perspective view of the tree complete with one end secured to the bur-piece but the pad removed. Fig. 6 is a plan view of the pad-bottom before it is packed. Fig. 7 is a plan view of the bur-piece. Fig. 8 is a plan view of the board or plate upon the packing. Fig. 9 is a side elevation of the pad complete. Fig. 10 is a plan view of the stiffening plate. Fig. 11 is a cross section of one of the pads on the tree. Fig. 12 is a longitudinal section of one of the pads with the stiffening plate therein and the terret.

Like characters of reference denote corresponding parts in each of the figures.

In the drawings, 2 designates the body of the tree, which consists of a single wire bent in the form of a saddle tree with its free ends 4 and 5 projecting towards each other but separated a short distance. The ends 6 of the tree are formed at practically right angles to the sides 8 and 10. A clasp or hook 12 of about the width of the length of the end 6 is pivoted upon each end by bending one end of the clasp into a hook or loop 14. The body of the clasp is then bent so as to project about parallel to the body of the tree.

At the center of the tree is a plate 18 shown in blank in Fig. 4 which consists of a central portion 20 provided with the opening 22 and smaller openings 24. Integral with the central portion are side flaps 25 in each of which are formed hooks 26 by cutting a V-shaped notch therein and bending the V at an angle to the face of the flap. The end 28 is bent around one side of the body of the tree at 30 and the ends 34 are also bent around the same side of the body, one on each side of the end 28. The opposite ends 34 are bent around the free ends 4 and 5 of the body and the entire end 35 is doubled upon itself to stiffen or stay the plate 18 and when the plate 18 with the hooks 26 and the clasps or hooks 12 are in position they will appear as shown in Fig. 5.

The saddle pads 36 are made separate from each other and separate from the tree with the pad-bottoms 38 (shown in Fig. 6) provided with scalloped edges 40. This pad-bottom is packed in any well known manner and then there is placed upon the packing a plate 41, which plate is flat and slightly narrower than the width of the packing extending to near each end of the pad, and when in position, rests upon and covers the packing. Above this is placed the bur-piece 42 shown in Fig. 7, having oblong openings 44 and 45 with the slots 46 and holes 48. This bur-piece is placed over the top of the plate 41 upon the packed pad and the edges 40 of the pad-bottom 38 are bent over upon the bur-piece 42 and secured thereto. It will be seen that, by scalloping the ends 40 of the pad-bottoms they can be bent over and secured without afterwards paring and cutting to make them lie flat.

When it is desired to prevent the pads from bending and to maintain them rigidly, there is provided a plate 50 of metal or other rigid material about the same width but a trifle shorter than plate 41. This plate is provided with holes 49 corresponding to the holes 48 in the bur-piece and openings 47 corresponding to the openings 45 in the bur-piece.

The mode of assembling is as follows: Starting with the plate 18 secured in position and the hooks or clasps 26 projecting out slightly from the surface of the flaps 25 and the ends 34 secured upon the wire at 30 and the ends 32 around the free ends 4 and 5 of the tree and the tree bent into the desired shape: The operator crowds each end 6 of the tree in a pad beneath the bur-piece 42 and above the plate 41 and until the hook 12 passes through the hole 44 in the bur-piece, when the hook is bent over upon the top of the bur-piece and the hooks 26 are brought into engagement with the openings 46 in the bur-piece and are bent down towards the inner end. These hooks 12 and 26 will then rigidly hold the pads in engagement with the tree. If it be desired to make the pads rigid, then a plate 50 may be inserted in each pad between the bur-piece and the plate 41 till one end rests upon the clasp 12 and the other is bent downward beneath the plate 18 between the two sides of the tree. The housing or skirt may then be secured upon the saddle thus formed, by inserting a bur or nut through the opening 45 in the bur-piece and along under one of the holes 48. A terret 55 is then passed through the skirt and hole 48 and screwed into the bur or nut beneath the bur-piece. When the pad is to be rigid, then the nut is passed through the opening 45 in the bur-piece and through the corresponding opening 47 in the plate 50 and the terret is passed through the skirt and the opening 48 in the bur-piece and corresponding opening 49 into the plate 50 and screwed into the nut beneath said plate.

It will be observed that this saddle can be made with very little cost and without the assistance of an expert or a skilled mechanic and that there will be no necessity for rivets, tacks or staples and the like to unite the pads with the bur-piece to the tree.

Having now described my invention, what I claim is:—

1. In a harness saddle, packed pads, a tree formed of a single wire, and clasps on each end of the tree adapted to engage the pads and hold the pads rigidly on the tree.

2. In a harness saddle, packed pads, a tree formed of a single wire adapted to be inserted in both of the pads, and a plurality of clasps secured to the tree and adapted to engage the packed pads and hold the pads on the tree.

3. In a harness saddle, packed pads, a bur-piece in each pad to which the pad-bottoms are secured, and a tree formed of a single wire and provided with clasps thereon and adapted to be inserted in the pads after packing to engage the bur-piece and rigidly hold the pads on the tree.

4. In a harness saddle, pads formed separate and each provided with a bur-piece, a tree, a clasp in each end of the tree, a central plate attached to the tree and provided with clasps and the clasps at the ends of the tree and on the central plate adapted to engage the bur-piece and hold the pads on the tree.

5. In a harness saddle, separate packed pads, a bur-piece in each pad to which the pad-bottoms are attached, a plate between the bur-piece and the packing, a tree formed of a single wire, clasps secured to each end of the tree and adapted to engage the bur-piece in each pad and hold the pads on the tree with the ends of the tree between the plate over the packing in the pads and the bur-piece.

6. In a harness saddle, pads provided with packing, a bur-piece in each pad provided with openings near each end to which the pad-bottom is secured, a tree formed of a single wire with the ends of the wire free and disconnected, a clasp at each end of the tree, a clasp near the center of the tree and all of said clasps adapted to engage the bur-piece and hold the packed pads upon the tree.

7. In a harness saddle pads formed separate and provided with packing, a bur-piece provided with openings near each end and a tree formed of a single wire provided with clasps adapted to engage the openings in the bur-piece and bent upon the outer surface of the bur-piece to hold the pad upon the tree.

8. In a harness saddle, packed pads, a bur-piece in each pad to which the pad-bottom is secured, a tree provided with clasps adapted to engage the bur-piece and hold the pads on the tree, a plate over the packing, and a plate inserted in each pad beneath the bur-piece between the wires forming the tree, with one end resting on the clasp at the end of the tree and the other end on the plate over the packing in the pad.

9. In a harness saddle, separate pads provided with packing, a bur-piece provided with openings near each end to which bur-piece the pad-bottom is secured, in combination with a tree, a clasp at each end of the tree, a plate secured to the tree near its center, a plurality of clasps on said plate adapted with the clasps at the ends of the tree to engage the openings near both ends of the bur-piece and secure the pads on the tree.

10. In a harness saddle, a plurality of pads provided with packing, a bur-piece in each pad to which the pad-bottom is attached and provided with openings near each end, a plate between the bur-piece and the packing in each pad, in combination with a tree formed of a single metal piece, a clasp pivoted to the outer ends of the tree and adapted to engage the opening in one end of the bur-piece, a plate secured to the tree near its center and provided with a plurality of clasps adapted to engage with the openings in the opposite ends of the bur-piece and secure the pad on each end of the tree, with the tree between the bur-piece and the plate over the packing.

11. A harness saddle, consisting of a plurality of separate pads provided with packing, a bur-piece for each pad provided with openings therethrough near each end, in combination with a tree formed of a single wire with the ends of the wire free and disconnected, a clasp in each end of the tree adapted to engage the openings in one end of the bur-piece, a plate secured across the central portion of the tree and engaging the free ends of the wire, clasps on each side of the plate adapted to engage slots near the inner ends of the bur-piece and bent upon the surface of the bur-piece to hold the piece on the tree.

In testimony whereof I affix my signature, in presence of two witnesses.

CASPER H. GRINGS.

Witnesses:
V. L. HATTER,
W. B. KEOGH.